Rob.t A. Haw.
Potato Digger.

No. 117415. Patented Jul 25 1871.

Witnesses:
Victor Hagmann
J. S. Fowler

Inventor:
Robert A. Haw
By Hill & Ellsworth
Attys.

UNITED STATES PATENT OFFICE.

ROBERT A. HAW, OF BUCKSPORT, CALIFORNIA.

IMPROVEMENT IN POTATO-DIGGERS.

Specification forming part of Letters Patent No. 117,415, dated July 25, 1871; antedated July 20, 1871.

*To all whom it may concern:*

Be it known that I, ROBERT A. HAW, of Bucksport, in the county of Humboldt and State of California, have invented certain Improvements in Potato-Diggers; and I declare the following to be a full, clear, and exact description thereof, reference being had to the accompanying drawing, in which—

Figure 1:
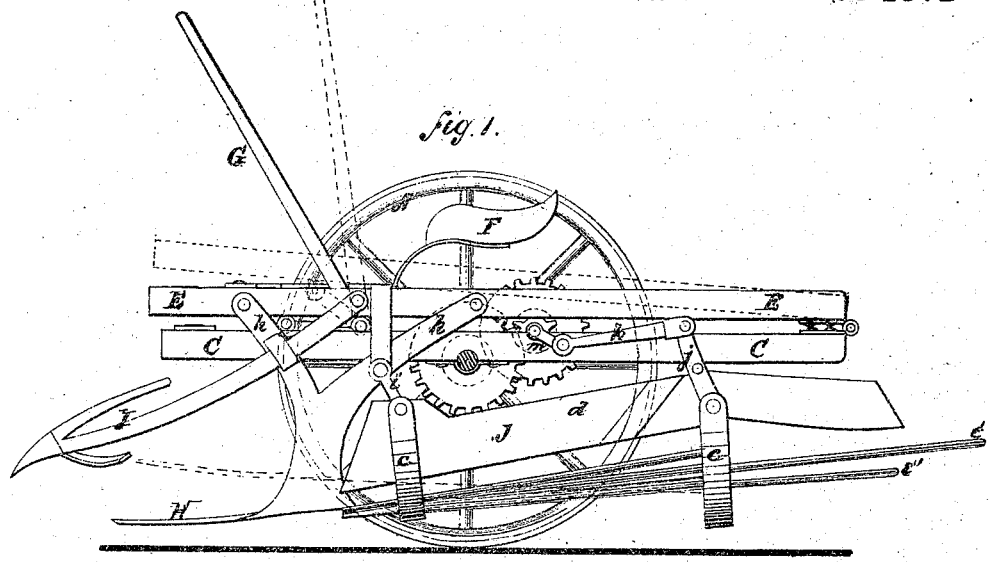
Figure 2:
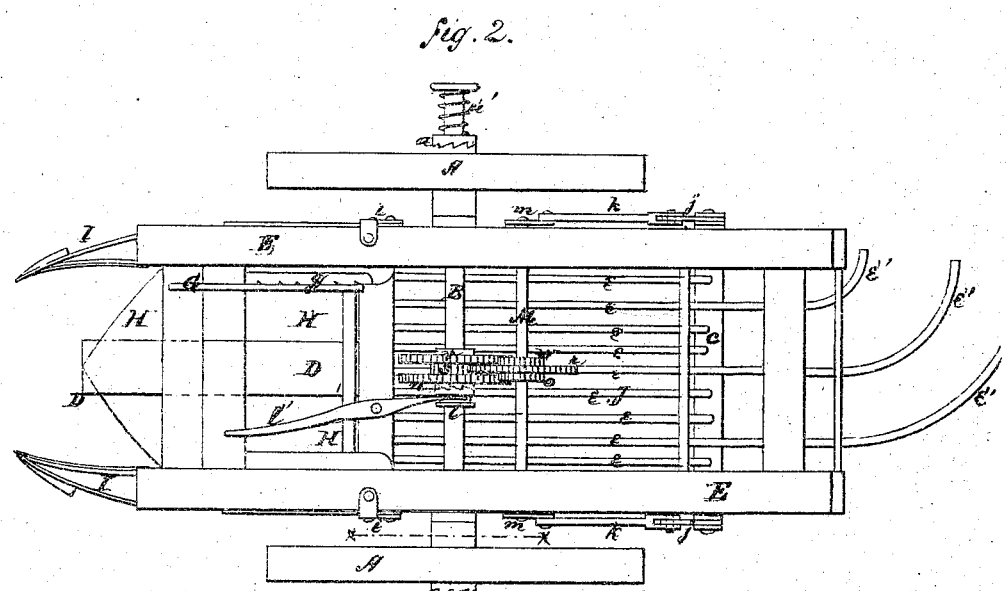
Figure 3:
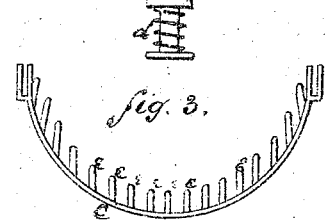

Figure 1 is a section through line $xx$ of Fig. 2. Fig. 2 is a plan, the seat having been removed. Fig. 3 is a rear elevation, showing a part of the rods $e\ e$.

Similar letters of reference indicate like parts.

This invention relates to that class of potato-diggers which is mounted on wheels and operates by horse-power; and it consists, first, in an improved method of hanging the shovel and separator, whereby they can be adjusted more perfectly than heretofore; secondly, in an improved form of separator; and thirdly, in an improved construction of running-gear, by which the separator is operated by power derived from the traction-wheels.

In the drawing, A A represent the traction-wheels, and B an iron axle upon which they are mounted, both of them working loosely on the axle and engaging with sliding clutches $a\ a$, operated by springs $a'\ a'$, as shown in Fig. 2. So long as either of the wheels is moving forward it engages with its clutch $a$, which, being feathered to the axle, communicates the forward rotation thereto. Whenever either wheel turns backward, however, its clutch ceases to engage, and allows it to turn without turning the axle. The clutches are, therefore, "rights-and-lefts"—that is, they allow the machine to be turned short round in either direction without interfering with its action, the working parts being always operated from that wheel which turns forward. The axle thus constructed supports a fixed horizontal frame, C, to which are attached the tongue D and driver's seat F. A movable frame, E, of similar form, rests upon the fixed frame, as shown in Fig. 1, its rear end being so hinged thereto that its front end can be elevated or depressed by means of a lever, G, operating a rock-shaft provided with arms that raise and lower the frame when it is worked. A rack, $g$, is fastened to the inner edge of the frame E, so that the lever can be set in any position, elevating the frame to any required extent. H is the excavating-shovel, attached to the movable frame by arms $h\ h$; and I I are vertical cutters operating on each side immediately in advance of the shovel, for the purpose of cutting and separating the weeds, grass, vines, &c., between the rows or lodged on the sides of the hills. Directly behind the shovel extends the separator J, which is hung to the movable frame E by means of links $i\ i$ at its forward end, and to the frame C by pivoted levers $j\ j$ at its rear end, so that by vibrating said levers a peculiar motion is imparted to it, as hereinafter described. The construction of the separator is a matter of considerable importance, and contains several novel features. It is composed of parallel rods $e\ e\ e$ arranged longitudinally under the frame C, and supported by two or more curved bars, $c\ c$. At the forward end the rods may rest directly on the bars; but at their rear end they are bent down about three inches, so as to depress the bar that distance below the path traveled by the potatoes, vines, &c., and prevent it from catching them and clogging the machine. In a full-sized machine a supporting-bar may be necessary near the middle of the separator, and, when used there, is to be placed below the level of the rods, and their ends are to be bent down and fastened to it, as here shown, at the rear end of the machine. A few of the rods are prolonged, as shown at $e'\ e'$, and are bent round to one side so as to separate the vines from the tubers, discharging the latter directly in the track of the machine and the former alongside of it. The rods thus prolonged are supported by means of short posts welded or otherwise fastened to the bar $c$ and to the side of the rods. The sides of the separator may, if preferred, be made of sheet-metal plates or boards $d\ d$ instead of rods, as shown in Fig. 1. The separator, constructed as described, is vibrated longitudinally in a curved line by power derived from the main axle, communicated through multiplying gearing, and finally applied to the lever $j$ by means of a pitman, $k$. For the purpose of simplifying the machine, by preventing accumulation of shafts and gearing, and thereby saving weight of material and cost of construction, I employ a simple supplementary axle or shaft, M, mounted on the frame C and provided with cranks $m\ m$, which operate the pitmen K K on each side of the machine; and I give this shaft a very rapid rotary motion by means of a system of gear-wheels, $n\ o\ r\ s\ v\ w$, operating as follows:

The large wheel $n$, running loosely on the main axle, can be readily fixed thereto by means of a sliding clutch, $l$, worked by a lever or treadle, $l'$. When thus fixed to its shaft this wheel operates the small pinion $o$, running loosely on the other shaft, and this pinion being fastened to the side of the large wheel $r$, also running loosely on this shaft, causes the latter wheel to rotate. The wheel $o$ gears with the loose pinion $s$ on the axle, and the pinion $s$, being fastened to the large loose wheel $v$, rotates the latter. The wheel $v$, gearing with the fast pinion $w$ on the shaft $M$, rotates the shaft itself. In the whole train there is but one permanently-fixed wheel, $w$, and one, $n$, which can be made fast to its shaft by moving the treadle $l'$.

The arrangement of gear is very compact and requires but little weight of metal, while the speed can be multiplied by it to any desired extent. As shown in the drawing, it is multiplied about twenty-seven times, each master-wheel being three times the size of its pinion. The train can be increased, of course, by adding other wheels, if desired.

In going to and returning from the field the driver raises the forward end of the supplemental frame E, and thereby lifts the shovel and cutters entirely clear of the ground. The length of this frame and the fact of its pivot being at its extreme rear end enables the front end to be raised not only more easily, but to a much greater distance, than if the frame were shorter or the pivot nearer the axle. At the same time that the driver thus lifts the shovel from the ground he places his foot on the treadle and pushes it to the right, which causes it to disengage the clutch $l$ from the wheel $n$, leaving the latter loose on the axle and instantly stopping the vibration of the separator.

When in operation in the field the depth at which the shovel will run can be regulated easily by means of the lever G. The potatoes, vines, and dirt excavated with the tubers are, by the progress of the machine, forced back upon the separator, and are agitated by its rapid vibrations with such effect that, by the time they pass over two-thirds of its length, the dirt is shaken from the tubers and dropped between the rods to the ground. Continuing to pass along, the tubers are detached from the vines and dumped at the ends of the bent-down rods $e\ e$, and the vines are carried still further back on the long rods $e'\ e'$ and discharged at the side of the track in a separate row from the potatoes.

Having thus described my invention, what I claim as new, and desire to secure by Letters Patent, is—

1. In a potato-digging machine, the combination of the fixed frame C with the supplemental frame E arranged above the fixed frame, as described, and hinged thereto at its rear end behind the axle, for the purpose of supporting at its forward end the shovel, cutters, and front end of the separator, substantially as herein set forth.

2. A separator adapted to be used in a potato-digging machine, when formed with a series of parallel rods, $e\ e\ e$, supported in whole or in part by having their points turned down and fastened to transverse bars $c\ c$, substantially as described, and for the purposes set forth.

3. The rods $e'\ e'$, when prolonged beyond the rods $e\ e$ at the rear end of the machine, and bent around so as to discharge the vines at the side of the track, substantially as described.

4. The arrangement of the gear $n\ o\ r\ s\ v\ w$, in connection with the shafts B M, clutch and treadle $l\ l'$, pitmen $k\ k$, lever $j$, and longitudinally-vibrating separator J, substantially as described, and for the purposes set forth.

5. The arrangement of the cutters I I, shovel H, separator J, fixed frame C, movable hinged frame E, lever G, treadle $l$, and apparatus for vibrating the separator, substantially as described, and for the purposes set forth.

ROBERT A. HAW.

Witnesses:
L. HILL,
J. S. FOWLER.